US006817278B2

(12) United States Patent
Hennemann et al.

(10) Patent No.: US 6,817,278 B2
(45) Date of Patent: Nov. 16, 2004

(54) PISTON ASSEMBLY FOR HYDRAULIC CYLINDER

(75) Inventors: Matthew J. Hennemann, Burlington, IA (US); Roger D. Mickelson, West Burlington, IA (US); Philip A. Iannarelli, Burlington, IA (US)

(73) Assignee: CNH America LLC, New Holland, PA (US)

( * ) Notice: Subject to any disclaimer, the term of this patent is extended or adjusted under 35 U.S.C. 154(b) by 24 days.

(21) Appl. No.: 10/277,763

(22) Filed: Oct. 22, 2002

(65) Prior Publication Data

US 2004/0074385 A1 Apr. 22, 2004

(51) Int. Cl.⁷ ........................................ F16J 1/00
(52) U.S. Cl. ..................... 92/255; 92/258; 29/888.051
(58) Field of Search ............... 92/255, 258; 29/888.051

(56) References Cited

U.S. PATENT DOCUMENTS 48,692 A * 7/1865 Kendall ....................... 92/258
2,507,628 A * 5/1950 Gaines ........................ 92/114
3,108,514 A * 10/1963 Gordon ....................... 92/240
3,608,437 A * 9/1971 Little et al. ................. 92/85 R
3,759,146 A * 9/1973 Brotherton .................. 92/13.6
3,806,134 A * 4/1974 Schexnayder ............... 277/436
3,885,461 A 5/1975 Crisp
4,089,253 A 5/1978 Visser
4,669,364 A * 6/1987 Komatsu et al. .............. 92/128
4,917,003 A 4/1990 Kollross
5,026,246 A 6/1991 Bay et al.
5,511,301 A 4/1996 McGuire
5,680,913 A * 10/1997 Wood ......................... 188/285
6,386,088 B1 5/2002 Yoshimoto et al.

OTHER PUBLICATIONS

McMaster–Carr 1999–2000 catalog, p. 3028.*
Screws and Washer Assemblies—SEMS, ANSI/ASME B18.13 1987 p. J–8 to J–21.

* cited by examiner

*Primary Examiner*—Edward K. Look
*Assistant Examiner*—Igor Kershteyn
(74) *Attorney, Agent, or Firm*—Collin A. Webb; John William Stader

(57) ABSTRACT

A piston assembly for use in a hydraulic cylinder includes a piston head configured to slide axially within the hydraulic cylinder in response to changes in hydraulic pressure. The piston head has an axial through-hole. A piston rod has a proximal end axially abutting the piston head and a distal end extending outward through an end of the hydraulic cylinder. The proximal end of the piston rod has a threaded bore co-axial with the axial through-hole in the piston head. A bolt has a bolt head and an unthreaded shank portion adjacent the bolt head and a threaded shank portion away from the bolt head. The bolt secures the piston head to the proximal end of the piston rod when the bolt shank is inserted through the axial through-hole in the piston head and is threadingly engaged in the threaded bore in the piston rod. An annular washer is positioned and held captive on the unthreaded portion of the bolt shank between the bolt head and the piston head. The washer has a flat face abutting the piston head so as to concentrically transfer clamping force from the bolt head to the piston head when the bolt is threaded into engagement in the threaded bore in the piston rod. The piston head is secured between the bolt head and the piston rod.

7 Claims, 3 Drawing Sheets

PISTON ASSEMBLY FOR HYDRAULIC CYLINDER

FIELD OF THE INVENTION

The present invention is related to a linear hydraulic motor and piston assembly, and more specifically, the present invention relates to securing the piston head to the piston rod in a linear hydraulic actuator.

BACKGROUND OF THE INVENTION

Linear hydraulic motors are utilized in a variety of applications in machines and work vehicles to accomplish power operation and/or remote control of parts and components. For example, hydraulic motors are used as linear actuators for work implements and tools in agricultural and construction equipment. The operation or remote control is accomplished by an operator controlling the supply of pressurized hydraulic fluid to the motor from a control at the operator's station.

These hydraulic motors may be subject to frequent operation and may operate at pressures above 3600 psi pounds per square inch or more. In some work situations the piston assembly can be subject to large dynamic forces causing yielding or damage. For example, large forces are generated when a moving part reaches the end of stroke or an implement is slammed into a hard object, such as when a shovel or bucket of construction equipment is dropped onto hard pavement.

In some hydraulic motors, a conventional method of attaching a piston rod to a piston head is by means of a pivoting piston pin. The pivoting pin allows the piston to maintain alignment in the cylinder bore while permitting some angular displacement of the piston rod. However, in hydraulic cylinders that are used on agricultural or construction equipment and the like, it is conventional to pivotally mount the hydraulic cylinder to the frame with the end of the piston rod being pivotally mounted to a reactive member or tool. Thus, it is not necessary for the piston head to be pivotally mounted to the piston rod. Therefore, several types of non-pivoting attaching means have been developed for connecting the piston head to the piston rod.

One common construction utilized for securing the piston head to the piston rod end in linear hydraulic motors is a threaded or screw type connection. As shown in U.S. Pat. No. 3,885,461, one known screw type connection uses a threaded engagement between external threads on the rod and internal threads in the piston head and on a lock nut that is disposed adjacent to the piston head. The nut bears against the piston head and holds it in the desired position on the rod. As shown in U.S. Pat. Nos. 4,089,253 or 4,917,003, another screw type connection uses internal threads in an opening in or through the center of the piston head. Mating external threads are provided on the rod that extends into or through the piston head.

In some hydraulic cylinders for agricultural and construction equipment, as shown in U.S. Pat. No. 5,026,246, it is known to have a threaded bolt inserted through a through-hole in the piston head and threaded into a threaded bore in one end of the piston rod. The bolt is tightened to a proper clamp load to secure the piston head on the piston rod. A problem with this type of assembly is that considerable clamping torque is necessary to assure the attachment of the piston head to the piston rod. The clamping load of the bolt could possibly subject the metal of the machined piston head to excessive loads. The metal of the piston head could yield or be crushed when the piston head reaches the end of stroke or is abruptly stopped such as by an impact.

Piston heads are usually made of a softer material than the bolts. It is desirable to make the pistons out of a free-machining steel to simplify the machining of the delicate machined grooves needed for seals and bearings. A hardened washer is used to spread the high clamping load over a larger area on the piston to prevent crushing damage. If piston crushing occurs, the result is a loss of pre-load in the bolted connection, lowering the amount of load the piston assembly can withstand. If enough piston crushing occurs the bolt can lose all pre-load, at which point the bolt can fall out of the assembly, causing failure.

Fasteners manufactured with captured washer elements are called SEMS in the industry (see ANSI/ASME B18.13, 1987) and generally have been used to attach assemblies such as automotive interiors. The majority of SEMS fasteners have a diameter of less than ¾" for the bolt portion. They generally are not used as a means of producing a high-performance bolted joint, but rather the benefit of the SEMS comes from labor savings (faster assembly times) and error proofing (making sure a washer is always used.) The new use of SEMS fasteners in this invention is to economically obtain a high-strength, high-performance bolted joint with error proofed assembly.

Thus, it is an object of the present invention to provide a simple, reliable and economical mechanism for connecting the piston head and piston rod assembly that reduces the potential for premature failure or stress concentrations on the piston head caused by currently known attaching mechanisms during extreme but not uncommon work situations.

SUMMARY OF THE INVENTION

One embodiment of the invention relates to a piston assembly for use in a hydraulic cylinder. The piston assembly includes a piston head configured to slide axially within the hydraulic cylinder in response to changes in hydraulic pressure. The piston head has an axial through-hole. A piston rod has a proximal end axially abutting the piston head and a distal end extending outward through an end of the hydraulic cylinder. The proximal end of the piston rod has a threaded bore co-axial with the axial through-hole in the piston head.

A bolt has a bolt head and a shank. The shank has an unthreaded portion adjacent the bolt head and a threaded portion away from the bolt head. The bolt secures the piston head to the proximal end of the piston rod when the bolt shank is inserted through the axial through-hole in the piston head and is threadingly engaged in the threaded bore in the piston rod.

An annular washer is positioned and held captive on the unthreaded portion of the bolt shank between the bolt head and the piston head. The washer has a flat face abutting the piston head so as to concentrically transfer clamping force from the bolt head to the piston head when the bolt is threaded into engagement in the threaded bore in the piston rod. The piston head is secured between the bolt head and the piston rod.

The invention also includes a method for assembling a piston assembly for use in a hydraulic cylinder. A piston head is provided with an axial through-hole. A piston rod is provided with a threaded bore co-axial with the axial through-hole in the piston head. A threaded bolt is provided with a captive annular washer. The bolt is inserted through the through-hole in the piston head and threadingly engages the threaded bolt in the threaded bore so as to clamp the piston head to the piston rod.

BRIEF DESCRIPTION OF THE DRAWINGS

The present invention will become more fully understood from the following detailed description, taken in conjunction with the accompanying drawings, wherein like reference numbers refer to like parts, in which.

DETAILED DESCRIPTION OF THE PREFERRED EMBODIMENTS

Figure 1:
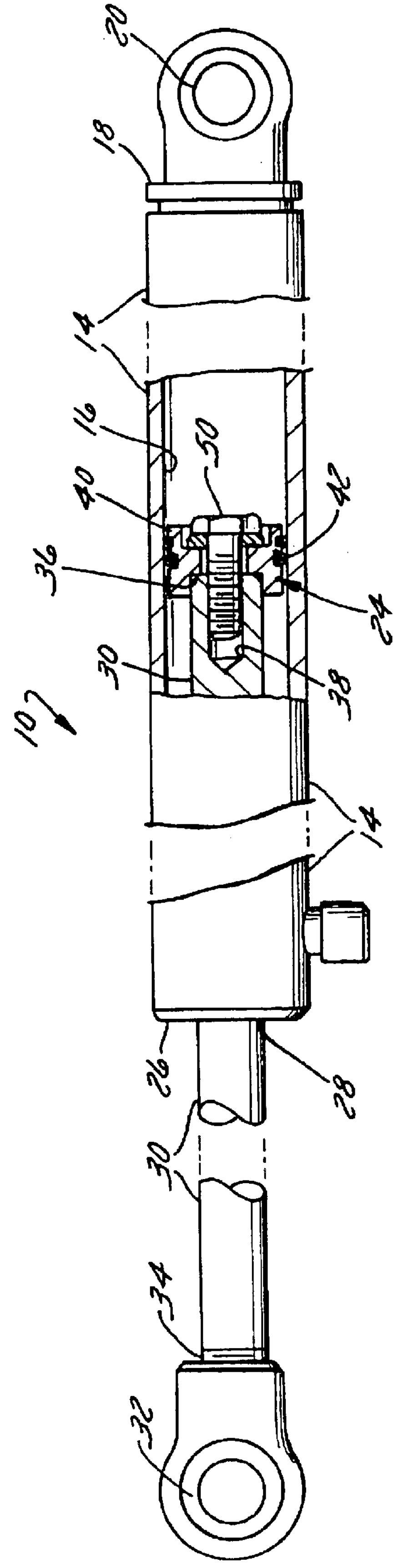
FIG. 1 is a partial cross-section of a piston head and piston rod assembly in a hydraulic cylinder.

Referring now to FIG. 1, there is shown a linear hydraulic motor or actuator 10 that includes a cylinder 14 having an inner surface 16. The cylinder is closed at one end by end cap 18 that is secured in a leakproof manner to cylinder 14, for example by welding. The end cap 18 is provided with a mounting mechanism such as eyelet 20. Further, a hydraulic fluid port (not shown) is provided in the cylinder 14 or end cap 18 to allow the flow of pressurized hydraulic fluid into the cylinder between the end cap 18 and a reciprocal piston assembly, generally shown as 24. The piston assembly includes a piston rod 30 and a piston head 40.

The opposite end of cylinder 14 is closed by a removable end wall assembly 26 that is secured to cylinder 14 by suitable mechanism such as bolts. A vent or port (not shown) that is similar to the previously referenced fluid port is provided in the cylinder or end wall assembly 26 such that the pressurized fluid may be admitted to one end of actuator 10 while the other end is vented in order to drive piston assembly 24 in a desired direction, as is conventionally known.

The piston rod 30 extends axially within cylinder 14 through a central passage 28 in end wall 26 and through an annular seal (not shown) within the end wall assembly such that piston rod 30 may be reciprocated without fluid leakage. As shown, piston rod 30 includes an attaching eye 32 on a distal end 34 of the rod. The opposite proximal end 36 of the piston rod abuts the piston head 40.

Figure 2:
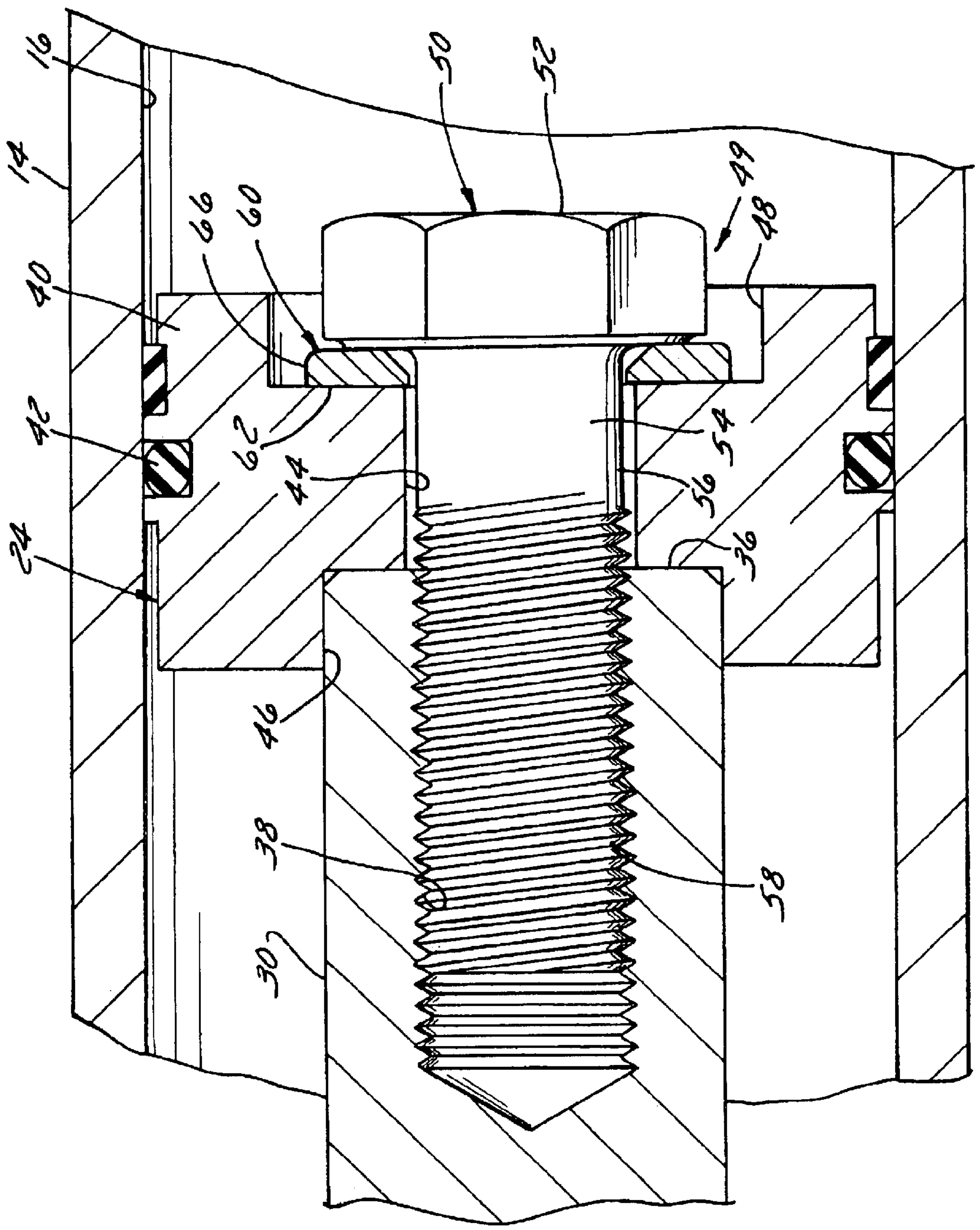
FIG. 2 is an enlarged cross-sectional view of a bolt and annular washer assembly connecting the piston head to the piston rod.

Referring now to FIG. 2, the piston assembly 24 includes a machined piston head 40, typically made of a metal that can be readily machined. For example, a circumferential groove is machined in the piston head for piston seal 42. The piston seal is mounted on it's the piston head circumference for sliding seal engagement with the inner surface 16 of cylinder 14. A through-hole 44 is machined axially through the center of the of piston head 40. An axial pilot recess 46 is also machined in the distal face of the piston head 40. The pilot recess 46 is sized to receive the proximal end 36 of the piston rod 30. The piston rod 30 includes a threaded interior bore 38 opening on the proximal end 36 of the rod that is coaxial with the through-hole 44 in the piston head. An axial bolt head recess 48 may also be machined into the proximal end of the piston head 40.

Figure 3:
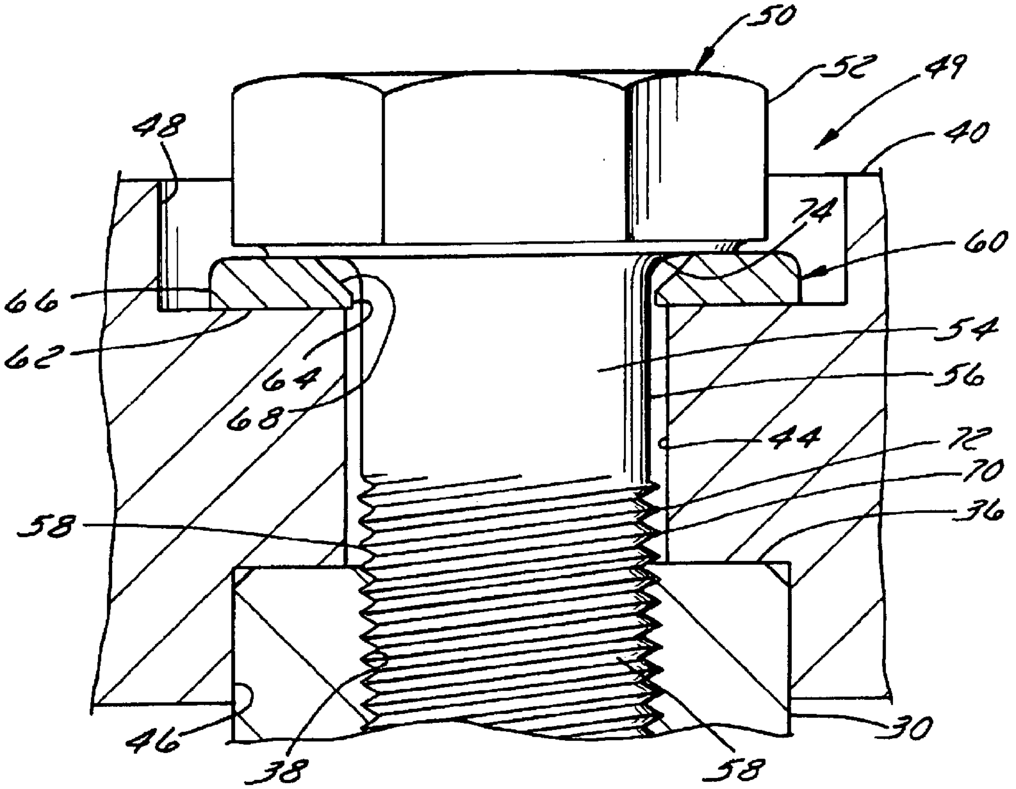
FIG. 3 is a further enlarged cross-sectional view of the bolt and annular washer assembly of the present invention.

Referring now to FIG. 3, a bolt assembly 49 including a bolt 50 with a captive annular washer 60 is provided. The bolt and washer assembly may be a SEMS type bolt assembly. The bolt 50 has a head 52 and a shank 54. The shank includes an unthreaded portion 56 and a threaded end portion 58. Threaded end portion 58 is used to secure the piston head 40 to the piston rod 30, as will be described.

The proximal end 36 of the piston rod is inserted into the pilot recess 46 in the piston head. The bolt 50, with the captive washer 60, is then inserted into the bolt head recess 48, if provided, with the shank extending through the through-hole 44 in the piston head 40. The threaded end portion 58 of the bolt is then threaded into the threaded bore 38 of piston rod 30 and the bolt is torqued to achieve the proper clamping force.

The captive annular washer 60 of the bolt assembly has at least one flat face 62 that is stamped, machined, ground or polished to a precise predetermined specification. One side of the washer can be made substantially flat in a stamping process, but the other side will be radiused as result of the operation. The radiused surface will be the surface that always faces the head of the bolt for these fasteners. Only one face of the washer needs to be flat to the precise predetermined specification. The other face of the washer must be reasonably flat. Thus, preferably only one face of the washer needs to be made flat to a predetermined specification (by further machining, grinding or polishing), thereby reducing manufacturing costs. The flat face 62 is positioned to abut the piston head 40 or the bottom of the bolt recess 48 and evenly transfer the clamping load from the bolt 50 to the piston head 40. Since the washer 60 is captured on the unthreaded portion 56 of the bolt shank, the washer is generally concentrically positioned under the bolt head 52 and therefore concentrically and evenly transfers the torque load (as well as external loads resulting from extreme yet not uncommon work situations) from the hardened bolt head to the softer metal piston head 40. By design, the inner diameter 64 of the annular washer 60 of the present invention has only a small clearance with the outer diameter of the bolt shank. Thus the contact area of the annular washer 60 with the piston head 40 is maximized, reducing the potential that the piston head will yield or be crushed.

A SEMS type bolt assembly 49 may be manufactured as follows. An annular washer 60 having a predetermined inner diameter 64 and outer diameter 66 is manufactured, such as by machining or stamping. One face 62 of the washer is further machined or ground so as to have a predetermined flatness. The inner diameter edge of the washer is chamfered 68 on the washer face opposite to the flat face 62. The washers are hardened by heat treatment, for example, or alternatively, the washers may be ground hardened.

A blank bolt 50 having predetermined dimensions is also manufactured. The blank bolts are also hardened, such as by heat treatment. The bolt shank 54 is then inserted through the annular washer 60 so that the flat face 62 of the washer is facing away from the bolt head 52 and the chamfered edge 68 of the washer is abutting the bolt head. By design, there is minimal clearance between the unthreaded bolt shank 56 and the inner diameter 64 of the washer.

Threads 70 are then rolled on the end of the shank portion 58 away from the bolt head so that the major diameter 72 of the rolled threads on the bolt is larger than the inner diameter 64 of the annular washer. Thus the annular washer 60 is trapped on the unthreaded portion 56 of the bolt shank by the major diameter threads 72 of the threaded portion, with the flat face 62 of the annular washer facing away from the bolt head. Additionally by design, the bolt has a specified unthreaded length 56 to improve the transition radius 74 and minimize stress concentration in the bolt to improve fatigue life. Current industry standards allow threads to be made up to this transition radius 74 and many bolt manufacturers make products threaded in this manner.

The chamfered edge 68 of the washer insures that any transition radius 74 associated with the bolt head does not contact an edge of the washer and produce stress risers during tightening or while in service. Most, if not all, manufacturers of hydraulic cylinders use a bolted joint that is assembled in the horizontal position. This allows the inner edge of the prior art washer to contact the transition radius 74 of the bolt as a result of gravity, potentially causing an undesired stress concentration in the bolt. The use of a SEMS bolt assembly in the present invention reduces the possibility of this undesired stress concentration. Having the flat face 62 of the annular washer orientated to face opposite the bolt head insures that the washer will have flat, even and concentric contact with the piston head 40 or the bottom of the bolt recess 48 in the proximal end of the piston head.

Figure 4:
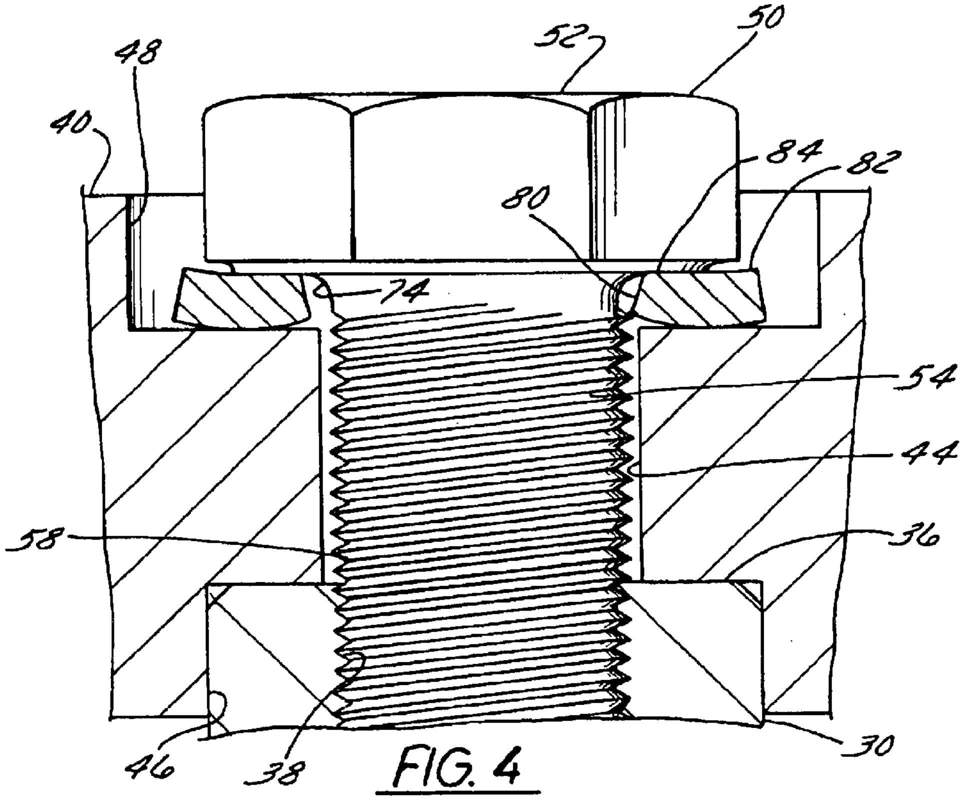
FIG. 4 is an enlarged cross-sectional view similar to FIG. 3 showing a prior art bolt and washer assembly.

The present invention provides an efficient and inexpensive means for securing a piston head 40 to a piston rod 30 with minimal potential for unfavorable washer alignment or stress concentrations known to occur in prior art bolt assemblies, such as shown in FIG. 4. Note that the prior art annular washer 80 is positioned off-center relative to the bolt due to the large inner diameter opening required for clearance over the bolt threads during assembly. Being off-center contributes to washer curling 82 because of the uneven and non-concentric loading. The edge of the prior art washer also contacts the transition radius 74 of the bolt head at 84 potentially causing stress risers. The prior art annular washer in FIG. 4 also must necessarily have two flat faces or be properly orientated during assembly to insure that one flat face abuts the piston head after assembly.

In contrast, the captive washer 60 of the present invention can be less expensive to manufacture and is always properly orientated, even if the piston assembly 24 is disassembled and re-assembly during field maintenance. The above deficiencies in the piston head connecting mechanisms of the prior art could lead to premature piston assembly failure during extreme but not uncommon use of the hydraulic actuator.

Thus, a hydraulic piston rod assembly has been described in accordance with the present invention. While the invention has been described in conjunction with a specific embodiment, it is understood that other alternatives and modifications will be apparent to those skilled in the art in light of the foregoing description. Accordingly, it is intended that such alternatives and variations are embraced and fall within the spirit and scope of the appended claims.

What is claimed is:

1. A method for assembling a piston assembly for use in a hydraulic cylinder, comprising:

providing a piston head with an axial through-hole;

providing a piston rod with a threaded bore co-axial with the axial through-hole in the piston head;

providing a threaded bolt with a bolt head and a captive annular washer;

inserting the bolt through the through-hole in the piston head; and threadingly engaging the threaded bolt but the threaded bore so as to clamp the piston head to the piston rod.

2. The method according to claim 1, wherein the step of providing a threaded bolt and a captive annular washer comprises machining a flat face of the annular washer.

3. The method according to claim 1, wherein the step of providing a threaded bolt comprises cutting threads on a portion of the bolt shank to have a major diameter that is larger than the inner diameter of the annular washer, the bolt including an unthreaded portion having a shank diameter that is smaller than the inner diameter of the annular washer, and the step of threading engaging the threaded bolt comprises capturing the annular washer on the unthreaded portion.

4. The method according to claim 1, wherein the step of providing a piston head comprises machining a distal end of the piston head to have an axial pilot recess and the step of threadingly engaging the threaded bolt comprises placing the proximal end of the piston rod in the axial pilot recess.

5. The method according to claim 1, wherein the threaded bolt and captive annular washer are metal, and the step of providing a threaded bolt and annular washer comprises hardening the metal.

6. The method according to claim 1, wherein the step of providing a piston head comprises forming an axial bolt recess in the proximal end of the piston head.

7. The method of claim 1, wherein the annular washer has a flat face orientated away from the bolt head and the flat face concentrically transfers clamping force from the bolt head to the piston head.

* * * * *